United States Patent Office 2,843,588
Patented July 15, 1958

---

2,843,588

DERIVATIVES OF THIOPHOSPHORIC ACID

Walter Lorenz, Wuppertal-Elberfeld, Germany, assignor to Farbenfabriken Bayer Aktiengesellschaft, Leverkusen, Germany, a corporation of Germany No Drawing. Application July 17, 1956
Serial No. 598,257

Claims priority, application Germany February 26, 1953

1 Claim. (Cl. 260—248)

The present invention relates to new derivatives of thiophosphoric acid and to a process of making the same; more particularly the invention is concerned with compounds of the general formula

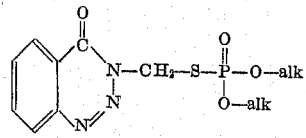

in which alk stands for an alkyl radical having 1–2 carbon atoms.

The new compounds can be obtained by reacting N-halogenomethyl-benzazimides, which may be substituted in the benzene nucleus with the salts of dialkylthio-phosphoric acids. The reaction is preferably carried out in an inert diluent. Suitable diluents according to the invention are especially ketones but alcohols or other solvents such as benzene or toluene may also be employed. This application is a continuation-in-part of my application S. N. 487,458, filed February 10, 1955 (now Patent No. 2,758,115), which latter application is in turn a continuation-in-part of my application S. N. 411,025, filed February 17, 1954 (now abandoned).

Due to the high reactivity of N-halogenomethylbenzazimides the reaction starts already at room temperature; it is advantageous, however, to complete the reaction at slightly elevated temperatures.

The N-halogenomethylbenzazimides employed as starting products for the process of the invention are obtainable from the corresponding methylol compounds with the aid of halogenating agents in known manner.

The compounds obtained according to the invention are either solid, crystalline substances having a low melting point or non-distillable, water-insoluble oils. The new compounds obtained in accordance with the invention are highly effective against sucking and chewing insects, especially against spider mites. The new compounds are, therefore, very valuable plant protecting agents.

In the following some reactions are described by way of example to illustrate the method of preparing N-methylolbenzazimide and, therefrom, N-halogenomethylbenzazimides which are used as starting material to obtain the insecticidal compounds contemplated by the invention.

PREPARATION A

*N-methylolbenzazimide (N-hydroxymethyl-benzazimide)*

250 grams of benzazimide are slightly heated with 1.6 liters of 30% formaldehyde and 300 ml. of water while stirring on the water bath for 15 minutes. The mixture solidifies to a viscous paste. By filtering the paste with suction the methylol compound is obtained in almost colourless needles. M. P.: 134–135° C.; yield: 277–300 grams, i. e. 92–100% of the theoretical.

Alternatively, the methylol compound can be obtained by dissolving the benzazimide, which is still wet from its manufacture, with twice the quantity of a 30% formaldehyde solution and eight times the quantity of water on the water bath, filtering the solution with some charcoal and allowing the solution to cool. The yield of N-hydroxy-methyl-benzazimide is almost quantitative.

PREPARATION B

*N-chloromethyl-benzazimide*

700 grams (4 mols) of dry N-hydroxymethyl-benzazimide are suspended in 1.5–2 liters of chloroform. 1.8 mols (about 130 ml.) of thionylchloride are added rapidly, the temperature rising to 35° C. Another quantity of thionylchloride, 3.8 mols (about 270 ml.), is run in so as to obtain a temperature of 40–50° C. The mixture is stirred at 60–65° C. for one hour, the residue separated by filtering and the solvent distilled off. The solidified residue is dissolved in 1 liter of acetone and the solution is poured into 4 liters of water with vigorous stirring to prevent the chloride from precipitating in clots. The mixture is filtered with suction, the filter cake washed until free from acid and the resulting N-chloromethylbenzazimide dried in air. M. P.: 124° C.; yield: 590–700 grams, i. e. 75–89% of the theoretical. By recrystallizing from 10 times the quantity of isopropyl alcohol the product is obtained in an entirely pure condition; M. P. 125°.

PREPARATION C

*N-bromomethyl-benzazimide*

53 grams of N-hydroxymethyl-benzazimide are suspended in 250 ml. of acetonitrile. 33.6 grams of phosphorus tribromide are added dropwise at 20–30° C. with cooling. After stirring at room temperature for one hour the mixture is poured into water, the reaction product filtered with suction and washed with water. The felted needles are crystallized from some methanol. M. P.: 126° C.; yield: 20 grams.

The following examples are given to illustrate the invention without in any way limiting the same.

EXAMPLE 1

A solution of 20 grams of N-chloromethylbenzazimide in 200 cc. of methylethylketone is added at 50° C. dropwise to 24 grams of the ammonium salt of O,O-diethyl-thiophosphoric acid in 100 cc. of methylethylketone. The solution is heated at 70–80° C. for two hours, the precipitated ammonium chloride is filtered off after cooling and the solvent distilled in vacuum. The remaining oil is taken up in benzene, washed with water and dried over sodium sulfate. After distilling off the solvent O,O-diethyl-S-(benzaziminomethyl)-thiolphosphate is obtained as a red-brown colored, non-distillable oil. The yield amounts to 21 grams.

EXAMPLE 2

24 grams of N-bromo-methyl-benzazimide (M. P. 137–139° C.) and 18 grams of the ammonium salt of O,O-dimethyl-thiolphosphoric acid are suspended in 100 cc. of acetone at room temperature. The temperature rises slowly to about 30° C. while the N-bromo-methyl-benzazimide dissolves. Thereafter the reaction mixture is stirred for one hour at room temperature and then 2 hours at 50–60° C. The precipitated ammonium bromide is filtered off. From the filtrate the acetone is distilled off in vacuo, thus yielding 30 grams (100% of the theoretical) of O,O-dimethyl-S-(benzaziminomethyl)-thiolphosphate. The product obtained can be recrystallized from isopropyl alcohol or from diluted methanol or benzene by adding ether M. P. 81–83° C.

I claim:
The compound having the formula
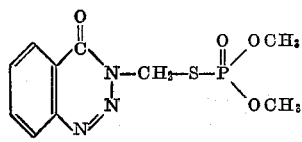
References Cited in the file of this patent
UNITED STATES PATENTS
2,758,115    Lorenz _____ Aug. 7, 1956
FOREIGN PATENTS
927,270    Germany _____ May 2, 1955